US010112829B2

(12) United States Patent
Ravikumar et al.

(10) Patent No.: US 10,112,829 B2
(45) Date of Patent: Oct. 30, 2018

(54) PRODUCTION OF PURE HYDROGEN FROM AMMONIA RICH SOUR WATER STRIPPER OVERHEAD

(71) Applicant: Fluor Technologies Corporation, Sugar Land, TX (US)

(72) Inventors: Ravi Ravikumar, Lancaster, CA (US); Paul M. Mathias, Aliso Viejo, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 15/000,389

(22) Filed: Jan. 19, 2016

(65) Prior Publication Data
US 2017/0203963 A1   Jul. 20, 2017

(51) Int. Cl.
| F04D 29/58 | (2006.01) |
| F01K 27/02 | (2006.01) |
| F01K 7/16 | (2006.01) |
| F04D 1/04 | (2006.01) |
| F01D 15/10 | (2006.01) |
| C01B 3/04 | (2006.01) |
| C01B 17/04 | (2006.01) |

(52) U.S. Cl.
CPC ............... *C01B 3/04* (2013.01); *C01B 17/04* (2013.01)

(58) Field of Classification Search
CPC ....................................................... C01B 3/04
See application file for complete search history.

(56) References Cited

U.S. PATENT DOCUMENTS

| 4,263,270 | A * | 4/1981 | Groenendaal | B01D 53/52 423/226 |
| 6,936,363 | B2 | 8/2005 | Kordesch et al. | |
| 2002/0023538 | A1 | 2/2002 | Agarwal et al. | |
| 2007/0178034 | A1 * | 8/2007 | Hojlund Nielsen | B01D 53/8612 423/242.1 |
| 2007/0212295 | A1 * | 9/2007 | Woods | C01B 3/34 518/700 |
| 2014/0275693 | A1 * | 9/2014 | Zink | C10L 3/102 585/833 |
| 2015/0014590 | A1 * | 1/2015 | Ravikumar | C01B 17/0408 252/372 |
| 2015/0107249 | A1 * | 4/2015 | Artinian | F01D 15/10 60/645 |
| 2015/0375159 | A1 * | 12/2015 | Tsai | B01D 53/047 95/97 |
| 2017/0087537 | A1 * | 3/2017 | Zhang | C01B 3/047 |

FOREIGN PATENT DOCUMENTS

WO     WO2015/177773     * 11/2015

OTHER PUBLICATIONS

Paul M. Mathias, et al., Thermodynamic analysis of CO2 capture solvents, International Journal of Greenhouse Gas Control, 2013, pp. 262-270, vol. 19, Elsevier Ltd.
PCT Application No. PCT/US2016/015924, International Search Report and Written Opinion, dated Oct. 17, 2016, 18 pages.
International Application No. PCT/US2016/015924, International Preliminary Report on Patentability, dated Aug. 2, 2018, 2018, 15 pages.

* cited by examiner

*Primary Examiner* — Douglas B Call
(74) *Attorney, Agent, or Firm* — Conley Rose, P.C.

(57) ABSTRACT

A method of producing hydrogen comprising receiving a sour gas comprising $CO_2$, $H_2S$, and ammonia from a sour water stripper; introducing the sour gas to an absorption system to produce an ammonia rich gas and a sulfide rich gas, wherein the ammonia rich gas comprises ammonia and $CO_2$, and wherein the sulfide rich gas comprises $H_2S$ and $CO_2$; compressing the ammonia rich gas in a compressing unit to a pressure of 400-600 psig to produce a compressed ammonia rich gas; introducing the compressed ammonia rich gas to an ammonia cracker unit comprising a catalyst to produce a cracked gas, wherein the ammonia cracker unit is characterized by a cracking temperature of 450-550° C., and wherein the cracked gas comprises hydrogen, nitrogen, and $CO_2$; and introducing the cracked gas to a PSA unit to produce hydrogen and a PSA tail gas, wherein the PSA tail gas comprises nitrogen and $CO_2$.

24 Claims, 1 Drawing Sheet

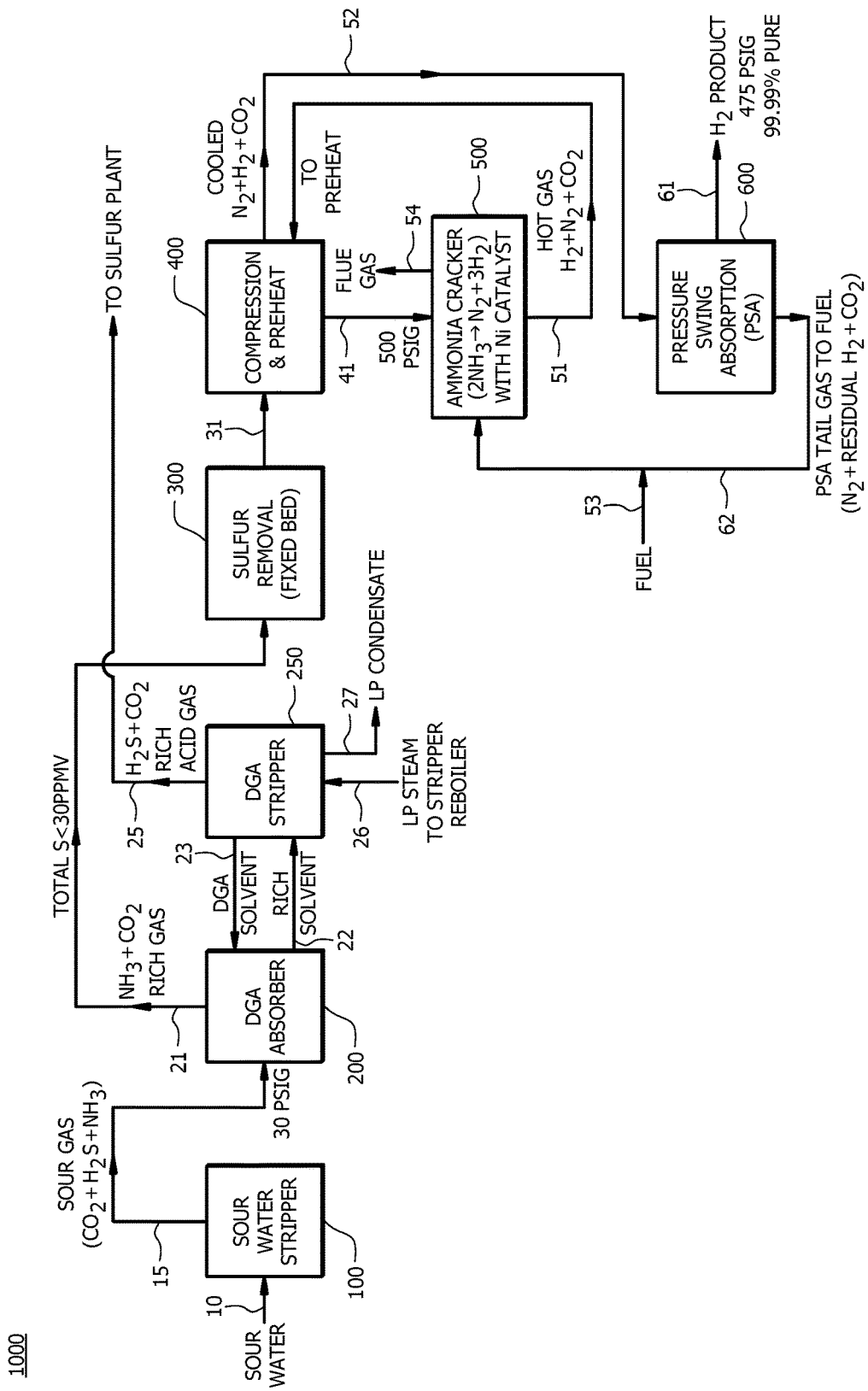

PRODUCTION OF PURE HYDROGEN FROM AMMONIA RICH SOUR WATER STRIPPER OVERHEAD

TECHNICAL FIELD

The present disclosure relates to methods of producing hydrogen, more specifically methods of producing hydrogen from a sour gas, such as for example a sour gas containing ammonia.

BACKGROUND

Hydrogen has many industrial uses, for example production of cyclohexane and methanol, which are intermediates in the production of plastics and pharmaceuticals; sulfur removal from fuels during oil-refining processes; hydrogenation of oils to produce fats; etc. Hydrogen can be produced by several processes, but industrially hydrogen is often produced by removal of hydrogen from hydrocarbons, for example by steam reforming of methane. However, such processes produce waste gases (e.g., sour gas) that contain hydrogen bound in various compounds, for example ammonia. Rather than disposing of the waste gases, it would be economically beneficial to recover hydrogen from the waste gases.

Sour gases containing sulfur can generally be directly fed into a Claus plant for conversion into elemental sulfur, or can be processed to enrich the gas in hydrogen sulfide, if necessary, prior to feeding the Claus plant. While the Claus reaction (converting hydrogen sulfide to elemental sulfur and water in the presence of oxygen) is conceptually simple and relatively easy to implement, significant limitations are present where the feed gas has relatively high concentrations of ammonia. For example, ammonia can be found in relatively high concentrations in sour water stripper gases, coke vessel off gases, off gases from acid gas removal units, low-temperature gasification off gases, and/or hydroprocessing off gases.

Regardless of the particular source, Claus plants require significant modifications to cope with high ammonia concentrations (e.g., require a modified Claus burner and/or use of oxygen enrichment for thermal decomposition). Some Claus processes could employ dedicated upstream systems, or combust ammonia and hydrogen sulfide in a single Claus thermal stage. However, most of these systems and methods tend to require significant modification of existing Claus plants and thus are not economically attractive.

Some methods contact ammonia with a concentrated acid in an absorption step to produce an ammonium salt solution that is then transferred to a stripper operating at a relatively low temperature to remove hydrogen sulfide therefrom, before the stripped solution is contacted with a base to obtain a corresponding crystalline ammonium salt. The remaining liquid can then be recycled to the absorption step. While such methods can be fairly effective in separating ammonia from hydrogen sulfide, numerous problems arise. For example, due to the concentrated acid solution, precipitation of corresponding ammonium salts may occur in the absorption step, especially where the ammonia concentration is relatively high. Also, due to the stripping step, the separated hydrogen sulfide may be released in a more diluted form that may necessitate a downstream concentration step.

Other methods sequentially isolate ammonia and hydrogen sulfide (and other impurities) in a process where ammonia is removed at low temperatures and elevated pressure using an aqueous acidic wash liquid, while hydrogen sulfide is removed in a later step via an alkaline washing liquid. Such methods not only require substantial equipment, but also regeneration of multiple solvents, adding significant costs. Moreover, such methods are limited to a maximum concentration of ammonia of 0.6 vol. %. Thus, there is an ongoing need for the development of methods for processing sour gases, for example sour gases that feed into sulfur recovery plants, by recovering important chemicals, such as hydrogen.

BRIEF SUMMARY

Disclosed herein is a method of producing hydrogen comprising (a) receiving a sour gas from a sour water stripper, wherein the sour gas comprises carbon dioxide, hydrogen sulfide, and ammonia, (b) introducing the sour gas to an absorption system to produce an ammonia rich gas and a sulfide rich gas, wherein the sour gas comprises carbon dioxide, hydrogen sulfide, and ammonia, wherein the ammonia rich gas comprises ammonia and carbon dioxide, and wherein the sulfide rich gas comprises hydrogen sulfide and carbon dioxide, (c) compressing at least a portion of the ammonia rich gas in a compressing unit to a pressure of from about 400 psig to about 600 psig to produce a compressed ammonia rich gas, (d) introducing at least a portion of the compressed ammonia rich gas to an ammonia cracker unit to produce a cracked gas, wherein the ammonia cracker unit comprises a catalyst, wherein the ammonia cracker unit is characterized by a cracking temperature of from about 450° C. to about 550° C., and wherein the cracked gas comprises hydrogen, nitrogen, and carbon dioxide, and (e) introducing at least a portion of the cracked gas to a pressure swing adsorption (PSA) unit to produce hydrogen and a PSA tail gas, wherein the PSA tail gas comprises nitrogen and carbon dioxide.

Also disclosed herein is a method of producing hydrogen comprising (a) receiving sour water from a shift unit, wherein the sour water comprises water, carbon dioxide, hydrogen sulfide, and ammonia, (b) introducing at least a portion of the sour water to a sour water stripper to produce a sour gas, wherein the sour gas comprises carbon dioxide, hydrogen sulfide, and ammonia, (c) introducing at least a portion of the sour gas to an absorption unit comprising an absorber solvent to produce an ammonia rich gas and a sulfide rich solvent, wherein the sulfide rich solvent comprises at least a portion of the hydrogen sulfide of the sour gas and a portion of the carbon dioxide of the sour gas, wherein the ammonia rich gas comprises at least a portion of the ammonia of the sour gas and a portion of the carbon dioxide of the sour gas, and wherein the ammonia rich gas comprises sulfur in an amount of less than about 30 ppmv, (d) introducing at least a portion of the sulfide rich solvent to a solvent regeneration unit to produce a sulfide rich gas, and the absorber solvent, (e) introducing at least a portion of the sulfide rich gas to a sulfur recovery unit to produce sulfur, (f) recycling at least a portion of the absorber solvent produced in the solvent regeneration unit to the absorption unit, (g) compressing at least a portion of the ammonia rich gas in a compressing unit to a pressure of from about 475 psig to about 525 psig to produce a compressed ammonia rich gas, (h) introducing at least a portion of the compressed ammonia rich gas to an ammonia cracker unit to produce a cracked gas, wherein the ammonia cracker unit comprises a nickel-based catalyst, wherein the ammonia cracker unit is characterized by a cracking temperature of from about 475° C. to about 525° C., and wherein the cracked gas comprises hydrogen, nitrogen, and carbon dioxide, and (i) introducing at least a portion of the cracked gas to a pressure swing adsorption (PSA) unit to produce hydrogen and a PSA tail gas, wherein the PSA tail gas comprises nitrogen and carbon dioxide, and wherein the hydrogen is characterized by a purity of equal to or greater than about 99%.

BRIEF DESCRIPTION OF THE DRAWINGS

For a detailed description of the preferred embodiments of the disclosed methods, reference will now be made to the accompanying drawing in which:

FIG. 1 displays a schematic of a process for producing hydrogen from sour gas.

DETAILED DESCRIPTION

Disclosed herein are methods for producing hydrogen comprising (a) receiving a sour gas from a sour water stripper, wherein the sour gas comprises carbon dioxide, hydrogen sulfide, and ammonia; (b) introducing at least a portion of the sour gas to an absorption system (e.g., treating at least a portion of the sour gas in a diglycolamine (DGA) solvent based absorption system to remove most of the hydrogen sulfide) to produce an ammonia rich gas and a sulfide rich gas, wherein the ammonia rich gas comprises ammonia and carbon dioxide, and wherein the sulfide rich gas comprises hydrogen sulfide and carbon dioxide; (c) compressing at least a portion of the ammonia rich gas in a compressing unit to a pressure of from about 400 psig to about 600 psig to produce a compressed ammonia rich gas; (d) introducing at least a portion of the compressed ammonia rich gas to an ammonia cracker unit to produce a cracked gas, wherein the ammonia cracker unit comprises a nickel-based catalyst or a sulfur passivated nickel-based catalyst (to avoid carbon depositions), wherein the ammonia cracker unit is characterized by a cracking temperature of from about 450° C. to about 550° C., and wherein the cracked gas comprises hydrogen, nitrogen, and carbon dioxide; and (e) introducing at least a portion of the cracked gas to a pressure swing adsorption (PSA) unit to produce hydrogen and a PSA tail gas, wherein the PSA tail gas comprises nitrogen, and carbon dioxide. In an embodiment, the sour gas comprises ammonia in an amount of equal to or greater than about 10 mol %. In an embodiment, the absorption system comprises an absorber solvent comprising diglycolamine.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosed subject matter otherwise claimed. No language in the specification should be construed as indicating any non-claimed element essential to the practice of the disclosed subject matter.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified.

As used herein, the terms "comprise," "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures preceeded by "comprises [ . . . ] a" does not, without more constraints, preclude the existence of other devices or other sub-systems or other elements or other structures or additional devices or additional sub-systems or additional elements or additional structures.

Reference throughout this specification to "one embodiment," "an embodiment," or similar language means that a particular feature, structure, or characteristic described in connection with the embodiment is included in at least one embodiment of the present disclosure. Thus, appearances of the phrase "in one embodiment," "in an embodiment," and similar language throughout this detailed description may, but do not necessarily, all refer to the same embodiment.

The following discussion provides many exemplary embodiments of the disclosed subject matter. Although each embodiment may represent a single combination of disclosed elements, the disclosed subject matter is considered to include all possible combinations of the disclosed elements. Thus, if one embodiment comprises elements A, B, and C, and a second embodiment comprises elements B and D, then the disclosed subject matter is also considered to include other remaining combinations of A, B, C, or D, even if not explicitly disclosed.

In an embodiment, a method for producing hydrogen ($H_2$) can comprise obtaining a sour gas from a sour gas source, for example from a source in an industrial refining or petrochemical plant. For purposes of the disclosure herein, the term "sour gas" refers to gases comprising hydrogen sulfide and ammonia, and typically also carbon dioxide. Generally, the sour gas contains significant amounts of hydrogen sulfide ($H_2S$), for example equal to or greater than about 100 parts per million by volume (ppmv), alternatively equal to or greater than about 500 ppmv, alternatively equal to or greater than about 1,000 ppmv, alternatively equal to or greater than about 1 mole % (mol %), alternatively equal to or greater than about 3 mol %, alternatively equal to or greater than about 5 mol %, alternatively equal to or greater than about 10 mol %, alternatively equal to or greater than about 15 mol %, alternatively equal to or greater than about 20 mol %, alternatively from about 100 ppmv to about 20 mol %, alternatively from about 500 ppmv to about 15 mol %, or alternatively from about 1 mol % to about 10 mol % hydrogen sulfide, under standard conditions of temperature and pressure. As will be appreciated by one of skill in the art, and with the help of this disclosure, the composition and physical properties (e.g., temperature, pressure, etc.) of the sour gas can vary depending on its source. Further, as will be appreciated by one of skill in the art, and with the help of this disclosure, in some instances, the sour gas can have very high concentrations of hydrogen sulfide, depending on a sulfur content of a feedstock to a process that generates the sour gas.

In an embodiment, the sour gas can be generated by any suitable sour gas source. In some embodiments, the sour gas source can comprise a sour water stripper; an acid gas removal unit; a low-temperature gasification unit; a hydroprocessing unit that can be configured to receive a feedstock containing equal to or greater than about 2,000 ppm nitrogen, alternatively equal to or greater than about 2,500 ppm nitrogen, or alternatively equal to or greater than about 3,000 ppm nitrogen; and the like; or combinations thereof.

In an embodiment, the sour gas can be generated by various gasification and/or partial oxidation systems, such as low-temperature gasification systems, crude oil processing plants, wherein feedstocks can have a high nitrogen content, hydroprocessing units with wash water systems, sour water strippers, acid gas removal units, and the like, or combinations thereof. As will be appreciated by one of skill in the art, and with the help of this disclosure, hydrotreaters and/or hydrocrackers can generally produce off gases with little or no carbon dioxide, however, such gases are still suitable for use in conjunction with the methods of the present disclosure. Further, as will be appreciated by one of skill in the art, and with the help of this disclosure, besides single unit feed streams, various process streams can be combined in a process or plant to form an ammonia-containing a sour gas stream suitable for use in conjunction with the methods of the present disclosure.

In some embodiments, a low-temperature gasification unit (e.g., operating at from about 900° C. to about 1,100° C., or less) can produce a syngas, wherein at least a portion of the syngas can be subjected to a sour gas removal step. In other embodiments, a low-temperature gasification unit can produce a syngas, wherein at least a portion of the syngas can be introduced to a shift unit to yield a shifted syngas, wherein at least a portion of the shifted syngas can be subjected to a sour gas removal step. Generally, the sour gas obtained from a sour gas removal step can include significant quantities of sulfur-containing compounds, including hydrogen sulfide, and sulfur dioxide, and optionally carbon sulfide, carbonyl sulfide, and/or carbon disulfide, in addition to appreciable quantities of carbon dioxide and ammonia, and further contaminants, including phenol and hydrogen cyanide. Due to low temperatures in a gasification unit, ammonia quantities in the sour gas will in most cases exceed the ammonia concentrations suitable for use with an unmodified sulfur recovery unit (e.g., unmodified Claus unit, Claus unit without burner modifications for ammonia destruction and oxygen enrichment).

Generally, refineries and gasification plants that process feedstocks containing sulfur can liberate the sulfur in various unit operations as hydrogen sulfide, and such hydrogen sulfide can end up in various process water streams. Water that contains sulfide is generally referred to as "sour water." Reuse or disposal of sour water requires removing the sulfides from the water in a process called stripping, such as for example in a sour water stripper. Generally, sour water can contain significant amounts of hydrogen sulfide ($H_2S$), for example equal to or greater than about 100 parts per million by weight (ppmw), alternatively equal to or greater than about 500 ppmw, or alternatively equal to or greater than about 1,000 ppmw hydrogen sulfide. As will be appreciated by one of skill in the art, and with the help of this disclosure, the composition of the sour water can vary depending on its source. Further, as will be appreciated by one of skill in the art, and with the help of this disclosure, in some instances, the sour water can have very high concentrations of hydrogen sulfide, depending on a sulfur content of a feedstock to a process that generates the sour water.

In an embodiment, a method for producing hydrogen ($H_2$) can comprise receiving a sour gas from a sour water stripper, wherein the sour gas comprises carbon dioxide, hydrogen sulfide, and ammonia. While the current disclosure will be discussed in detail in the context of a sour gas received from a sour water stripper, it should be understood that any suitable sour gas comprising ammonia could be processed according to the disclosed methods for producing hydrogen.

In an embodiment, sour water can be received from (e.g., obtained from, produced by, etc.) a shift unit, wherein the sour water can comprise water, carbon dioxide, hydrogen sulfide, and ammonia, and wherein at least a portion of the sour water can be subjected to a sour gas removal step.

In an embodiment, a method for producing hydrogen ($H_2$) can comprise introducing at least a portion of the sour water to a sour water stripper to produce a sour gas (e.g., sour water stripper overhead) and stripped water, wherein the sour gas comprises carbon dioxide, hydrogen sulfide, and ammonia. Ammonia content in sour water stripper overhead in a refinery or a gasification plant can be relatively high when processing crude oil with high nitrogen and when utilizing gasifiers at relatively lower operating temperatures. This high ammonia content can create operating problems when the sour gas is routed to a sulfur plant (e.g., a sulfur recovery unit, a Claus unit, etc.). Generally, stripped water can comprise very low levels of residual ammonia (e.g., less than about 25 ppmw ammonia) and very low levels of residual hydrogen sulfide (e.g., less than about 10 ppmw hydrogen sulfide).

In an embodiment, the sour gas (e.g., sour gas obtained from a sour water stripper) can comprise ammonia in an amount of equal to or greater than about 10 mol %, alternatively equal to or greater than about 15 mol %, alternatively equal to or greater than about 20 mol %, alternatively equal to or greater than about 25 mol %, alternatively equal to or greater than about 30 mol %, alternatively equal to or greater than about 35 mol %, or alternatively equal to or greater than about 40 mol %. In an embodiment, the sour gas can comprise ammonia in an amount of from about 100 ppmv to about 40 mol %, alternatively from about 500 ppmv to about 20 mol %, or alternatively from about 1 mol % to about 10 mol %. The sour gas can be processed to remove ammonia down to a level where a total concentration of hydrogen sulfide in a gas stream to be processed in a Claus plant (without significant modifications of the Claus plant) exceeds an ammonia level in such gas stream; and wherein the removed ammonia can be pre-treated and used for hydrogen production via cracking.

In an embodiment, the sour gas (e.g., sour gas obtained from a sour water stripper) can comprise sulfur-containing compounds, including hydrogen sulfide, in an amount of equal to or greater than about 1 mol %, alternatively equal to or greater than about 3 mol %, alternatively equal to or greater than about 5 mol %, alternatively equal to or greater than about 10 mol %, alternatively equal to or greater than about 15 mol %, or alternatively equal to or greater than about 20 mol %.

In an embodiment, a molar ratio of ammonia to hydrogen sulfide in the sour gas (e.g., sour gas obtained from a sour water stripper) can be equal to or greater than about 1:1, alternatively equal to or greater than about 2:1, or alternatively equal to or greater than about 3:1.

In an embodiment, the sour gas (e.g., sour gas obtained from a sour water stripper) can comprise carbon dioxide in an amount of equal to or greater than about 5 mol %, alternatively equal to or greater than about 10 mol %, alternatively equal to or greater than about 15 mol %, alternatively equal to or greater than about 20 mol %, or alternatively equal to or greater than about 25 mol %.

In an embodiment, the sour gas (e.g., sour gas obtained from a sour water stripper) can be characterized by a pressure of from about 5 psig to about 50 psig, alternatively from about 10 psig to about 45 psig, alternatively from about 20 psig to about 40 psig, alternatively from about 25 psig to about 35 psig, or alternatively from about 25 psig to about 30 psig.

In an embodiment, a method for producing hydrogen ($H_2$) can comprise introducing at least a portion of the sour gas to an absorption system to produce an ammonia rich gas and a sulfide rich gas, wherein the ammonia rich gas can comprise ammonia and carbon dioxide, and wherein the sulfide rich gas can comprise hydrogen sulfide and carbon dioxide.

In an embodiment, the absorption system can comprise an absorption unit and a solvent regeneration unit, wherein the absorption unit comprises an absorber solvent, such as for example diglycolamine (DGA). In an embodiment, the absorber solvent can comprise DGA; any suitable strongly basic amine (e.g., an amine behaving strongly as a base), such as methylethylamine (MEA), piperazine, 2-methylpiperazine; blends of methyl diethanolamine (MDEA) with any suitable strongly basic amine; and the like; or combinations thereof. In an embodiment, the absorber solvent can be regenerable, e.g., the absorber solvent can be regenerated in the regeneration unit. Generally, the absorber solvent absorbs gas molecules such as hydrogen sulfide and carbon dioxide by reacting reversibly with such gas molecules to produce a sulfide rich solvent, for example in the absorption unit; and the sulfide rich solvent can subsequently undergo the reverse chemical reaction that releases the absorbed gases and regenerates the absorber solvent, for example in the solvent regeneration unit. For purposes of the disclosure herein, the term "absorber solvent" refers to a solvent that preferentially reacts with and consequently absorbs sulfur-containing compounds, including hydrogen sulfide. As will be appreciated by one of skill in the art, and with the help of this disclosure, the absorber solvent reacts preferentially with hydrogen sulfide, over carbon dioxide, although a certain amount of carbon dioxide will be also absorbed by the absorber solvent (by reacting with the absorber solvent). Further, as will be appreciated by one of skill in the art, and with the help of this disclosure, ammonia is not absorbed by the absorber solvent to any significant extent, although some ammonia might be solubilized in the absorber solvent based on the solubility of the ammonia in the absorber solvent under the conditions in the absorption unit (e.g., temperature, pressure, etc.).

In an embodiment, at least a portion of the sour gas and an absorber solvent can be introduced to an absorption unit to produce an ammonia rich gas and a sulfide rich solvent, wherein the ammonia rich gas comprises at least a portion of the ammonia of the sour gas and a portion of the carbon dioxide of the sour gas and wherein the sulfide rich solvent comprises at least a portion of the hydrogen sulfide of the sour gas and a portion of the carbon dioxide of the sour gas. In an embodiment, the absorption unit can comprise any suitable absorber column, wherein a gas phase (e.g., sour gas) interacts with a liquid phase (e.g., absorber solvent) via co-current flow, counter-flow (e.g., countercurrent), or cross-flow. Generally, absorption columns can be vertical and cylindrical columns or towers. In an embodiment, the absorption unit can comprise a countercurrent absorber column, wherein the sour gas can be introduced to the column countercurrent (e.g., opposing flow directions) to the flow of absorber solvent. In such embodiment, the sour gas can be in a gas state and the absorber solvent can be in a liquid state, such that the absorption occurs by gas-liquid contacting. In an embodiment, the absorber solvent can be introduced as a downflow at the top of the absorber unit, and the sour gas can be introduced (e.g., bubbled) at the bottom of the absorber unit. In such embodiment, the ammonia rich gas can be recovered at the top of the absorber unit, and the sulfide rich solvent can be recovered at the bottom of the absorber unit. The absorber unit can employ an absorber column typically comprising one or more trays and/or packing as a contacting device However, any other suitable contacting devices can be employed, such as for example static or dynamic mixers, spargers, impellers, etc. In some embodiments, the absorption unit can comprise a packed bed column, a tray column, a spray column, a falling film column, a bubble column, a sparged tank column, and the like, or combinations thereof.

In an embodiment, the absorption unit can comprise a co-current flow column with a short residence time. A co-current flow column with a short residence time could allow for a smaller amount of carbon dioxide of the sour gas to be absorbed by the absorber solvent and subsequently recovered in the sulfide rich gas, as the carbon dioxide exhibits a stronger absorption by the absorber solvent when compared to the absorption of the hydrogen sulfide by the absorber solvent.

In an embodiment, the ammonia rich gas can comprise substantially all of the ammonia present in the sour gas. In an embodiment, the ammonia rich gas can contain equal to or greater than about 50%, alternatively equal to or greater than about 60%, alternatively equal to or greater than about 70%, alternatively equal to or greater than about 80%, alternatively equal to or greater than about 90%, alternatively equal to or greater than about 95%, or alternatively equal to or greater than about 99% of the ammonia of the sour gas.

In an embodiment, the ammonia rich gas is substantially free of sulfur-containing compounds (e.g., $H_2S$). In an embodiment, the ammonia rich gas can comprise substantially none of the sulfur-containing compounds of the sour gas. In some embodiments, the ammonia rich gas can comprise less than about 1%, alternatively less than about 0.5%, alternatively less than about 0.1%, or alternatively less than about 0.01% of the sulfur-containing compounds of the sour gas.

In an embodiment, the ammonia rich gas can comprise sulfur (e.g., $H_2S$) in an amount of less than about 50 ppmv, alternatively less than about 40 ppmv, alternatively less than about 30 ppmv, alternatively less than about 20 ppmv, alternatively less than about 10 ppmv, alternatively less than about 5 ppmv, or alternatively less than about 1 ppmv.

In an embodiment, the ammonia rich gas can comprise carbon dioxide in an amount of less than about 30%, alternatively less than about 20%, alternatively less than about 15%, or alternatively less than about 5% of the carbon dioxide of the sour gas.

In an embodiment, the sulfide rich solvent can contain less than about 50%, alternatively less than about 40%, alternatively less than about 30%, alternatively less than about 20%, alternatively less than about 10%, alternatively less than about 5%, or alternatively less than about 1% of the ammonia of the sour gas.

In an embodiment, the sulfide rich solvent can comprise carbon dioxide in an amount of equal to or greater than about 30%, alternatively equal to or greater than about 20%, alternatively equal to or greater than about 15%, or alternatively equal to or greater than about 5% of the carbon dioxide of the sour gas.

In an embodiment, the sulfide rich solvent can comprise substantially all of the sulfur-containing compounds of the sour gas. In some embodiments, the sulfide rich solvent can comprise equal to or greater than about 99%, alternatively equal to or greater than about 99.5%, alternatively equal to or greater than about 99.9%, or alternatively equal to or greater than about 99.99% of the sulfur-containing compounds of the sour gas.

In an embodiment, at least a portion of the sulfide rich solvent can be introduced to the solvent regeneration unit to produce the sulfide rich gas, and the absorber solvent. Generally, the solvent regeneration unit can be similar to the absorber unit, but operating at different parameters (e.g., pressure, temperature, etc.). A pressure in the solvent regeneration unit can be lower than a pressure in the absorber unit to enable the sulfide rich solvent to release gases (e.g., hydrogen sulfide, carbon dioxide, etc.). A temperature in the solvent regeneration unit can be higher than a temperature in the absorber unit to enable the sulfide rich solvent to release gases (e.g., hydrogen sulfide, carbon dioxide, etc.). As will be appreciated by one of skill in the art, and with the help of this disclosure, a lower pressure and a higher temperature in the solvent regeneration unit can promote or enable a reverse reaction where the absorber solvent releases the gases it had reacted with (e.g., sequestered) in the absorber unit.

In an embodiment, the solvent regeneration unit can comprise any suitable desorption column (e.g., solvent regeneration column), wherein a gas or vapor phase (e.g., absorber solvent vapor) interacts with a liquid phase (e.g., sulfide rich solvent) via co-current flow, counter-flow (e.g., countercurrent), or cross-flow. Generally, desorption columns can be vertical and cylindrical columns or towers. In an embodiment, the solvent regeneration unit can comprise a countercurrent desorption column, wherein a portion of regenerated absorber solvent vapors can be introduced to the column countercurrent (e.g., opposing flow directions) to the flow of sulfide rich solvent. In an embodiment, the sulfide rich solvent can be introduced as a downflow at the top of the solvent regeneration unit, and a portion of the regenerated absorber solvent can be re-introduced at the bottom (e.g., bubbled) of the solvent regeneration unit as vapor. In such embodiment, the sulfide rich gas can be recovered at the top of the solvent regeneration unit, and the absorber solvent (e.g., regenerated absorber solvent) can be recovered at the bottom of the solvent regeneration unit. An overhead gas stream recovered at the top of the solvent regeneration unit can comprise the sulfide rich gas and absorber solvent vapors, and can be sent through a condenser to condense the absorber solvent, wherein the condensed absorber solvent can be returned to the top of the solvent regeneration unit. A portion of the absorber solvent recovered at the bottom of the solvent regeneration unit can be sent to a reboiler to produce absorber solvent vapors that can then be introduced (e.g., bubbled) to the bottom of the solvent regeneration unit. Generally, the reboiler can be heated with steam (e.g., low pressure steam at a pressure of from about 400 kPa to about 1,500 kPa), wherein the steam can be recovered from the reboiler as an aqueous condensate, and wherein the recovered aqueous condensate can be further converted into the steam used for heating the reboiler. The remainder of the absorber solvent recovered at the bottom of the solvent regeneration unit can be recycled back to the absorber unit. In some embodiments, the solvent regeneration unit can comprise a packed bed column, a tray column, a spray column, a falling film column, a bubble column, a sparged tank column, and the like, or combinations thereof.

In an embodiment, the sulfide rich gas is substantially free of ammonia. In an embodiment, the sulfide rich gas can contain less than about 50%, alternatively less than about 40%, alternatively less than about 30%, alternatively less than about 20%, alternatively less than about 10%, alternatively less than about 5%, or alternatively less than about 1% of the ammonia of the sour gas.

In an embodiment, the sulfide rich gas can comprise substantially all of the sulfur-containing compounds of the sour gas. In some embodiments, the sulfide rich gas can comprise equal to or greater than about 99%, alternatively equal to or greater than about 99.5%, alternatively equal to or greater than about 99.9%, or alternatively equal to or greater than about 99.99% of the sulfur-containing compounds of the sour gas.

In an embodiment, the sulfide rich gas can comprise carbon dioxide in an amount of less than about 90%, alternatively less than about 50%, alternatively less than about 20%, or alternatively less than about 10% of the carbon dioxide of the sour gas.

In an embodiment, at least a portion of the sulfide rich gas can be introduced to a sulfur recovery unit to produce sulfur. The sulfur recovery unit can be based on the Claus reaction, wherein hydrogen sulfide reacts with oxygen to produce elemental sulfur and water. Generally, the sulfur recovery unit can be located in a Claus plant for producing elemental sulfur. As will be appreciated by one of skill in the art and with the help of this disclosure, the sulfide rich gas need not be entirely depleted of ammonia for feeding to a sulfur recovery unit in a Claus plant. The sulfide rich gas can contain quantities of ammonia suitable for feeding into a sulfur recovery unit in a Claus plant, e.g., the sulfide rich gas can have an ammonia content of from about 0.1 mol % to about 10 mol %, alternatively from about 0.5 mol % to about 7 mol %, alternatively from about 1 mol % to about 5 mol %, or alternatively from about 1 mol % to about 3 mol %.

In an embodiment, a method for producing hydrogen ($H_2$) can comprise further introducing at least a portion of the ammonia rich gas to a sulfur removal unit to produce a purified ammonia rich gas. In an embodiment, the sulfur removal unit can be a sulfur guard bed, wherein the sulfur guard bed can remove traces of sulfur containing compounds that can be still present in the ammonia rich gas.

In some embodiments, the sulfur removal unit can comprise a fixed bed, wherein the fixed bed comprises mixed metal oxides, such as for example zinc oxides (ZnO), copper oxides (CuO, $Cu_2O$), nickel oxide (NiO), iron oxides (FeO), manganese oxides (MnO, $MnO_2$), and the like, or combinations thereof, wherein the mixed metal oxides can be unsupported or supported on supports such as alumina, silica, and the like, or combinations thereof. In an embodiment, the sulfur removal unit can comprise a PURASPEC fixed bed, which is commercially available from Johnson Matthey Process Technologies.

In an embodiment, the purified ammonia rich gas can comprise sulfur (e.g., $H_2S$) in an amount of less than about 50 ppmv, alternatively less than about 25 ppmv, alternatively less than about 10 ppmv, alternatively from about 10 ppmv to about 50 ppmv, or alternatively from about 20 ppmv to about 40 ppmv. As will be appreciated by one of skill in the art, and with the help of this disclosure, sulfur above certain levels could poison a catalyst in the ammonia cracker unit, and such levels are dependent on the type of catalyst used in the ammonia cracker unit, the type of ammonia cracker unit, process conditions for the ammonia cracker unit, etc.

In an embodiment, a method for producing hydrogen ($H_2$) can comprise compressing at least a portion of the ammonia rich gas (e.g., purified ammonia rich gas) in a compressing unit to a pressure of from about 400 psig to about 600 psig, alternatively from about 450 psig to about 550 psig, or alternatively from about 475 psig to about 525 psig to produce a compressed ammonia rich gas.

In an embodiment, the ammonia rich gas (e.g., purified ammonia rich gas) can be heated in the compressing unit concurrent with compressing the ammonia rich gas, wherein the compressed ammonia rich gas can have a temperature of from about 250° C. to about 500° C., alternatively from about 275° C. to about 475° C., or alternatively from about 300° C. to about 450° C. after preheating with an ammonia cracker effluent (e.g., cracked gas). The ammonia rich gas can be heated by exchanging heat with the cracked gas, as will be described in more detail later herein.

In an embodiment, a method for producing hydrogen ($H_2$) can comprise introducing at least a portion of the compressed ammonia rich gas to an ammonia cracker unit to produce a cracked gas, wherein the cracked gas comprises hydrogen, nitrogen, and carbon dioxide. In an embodiment, the ammonia cracker unit can comprise any suitable reactor, such as for example a tubular reactor, multitubular reactor, and the like, or combinations thereof.

In an embodiment, the ammonia cracker unit can comprise a nickel-based catalyst. In an alternative embodiment, ammonia dissociation or cracking can be accomplished using a sulfur passivated nickel-based catalyst, wherein an upstream trim sulfur removal is not required (e.g., a sulfur removal unit upstream of the compressing unit is not necessary). Ammonia dissociation (or cracking) reaction is endothermic, and a reaction dissociation rate depends on the temperature, pressure and catalyst type. Ammonia will split into nitrogen and hydrogen at high temperatures according to the general reaction $NH_3 \rightarrow N_2 + H_2$; however, in the presence of a catalyst (e.g., nickel-based catalyst), the temperature at which ammonia produces hydrogen can be lowered. In an embodiment, the ammonia cracker unit can comprise one or more catalyst filled tubes (e.g., nickel-based catalyst filled tubes). In an embodiment, ammonia cracking can take place in catalyst filled tubes (e.g., nickel-based catalyst filled tubes). In such embodiment, the catalyst filled tubes can be heated indirectly, such as for example by burning a fuel inside a reactor (e.g., a fire box) comprising the catalyst filled tubes (e.g., a tube-filled furnace). In an embodiment, any suitable fuel can be used for heating the ammonia cracker unit. Non-limiting examples of fuel suitable for use in the present disclosure for heating the ammonia cracker unit include methane, propane, butane, waste gas, and the like, or combinations thereof. In an embodiment, a flue gas can be emitted from the ammonia cracker unit, wherein the flue gas comprises fuel combustion products, such as carbon dioxide and water vapor. In some embodiments, a fuel can be burned at a bottom of the ammonia cracker unit, and a flue gas can be vented or emitted at the top of the ammonia cracker unit, wherein furnace tubes filled with catalyst are dispersed within the furnace vessel between the burners and the flue gas vent/outlet. As will be appreciated by one of skill in the art, and with the help of this disclosure, the fuel burning (e.g., burner flames) and the fuel combustion products do not contact directly the ammonia rich gas travelling through and cracking within the catalyst filled tubes (e.g., nickel-based catalyst filled tubes), the fuel burns inside the ammonia cracker unit and outside the catalyst filled tubes, and the fuel combustion products travel through the ammonia cracker unit and along an outer surface of the catalyst filled tubes towards an outlet for the flue gas.

In an embodiment, the ammonia rich gas can be introduced to the one or more catalyst filled tubes (e.g., nickel-based catalyst filled tubes), wherein the catalyst filled tubes are indirectly heated by burning a fuel, and as the ammonia rich gas travels along the catalyst filled tubes, ammonia dissociates into nitrogen and hydrogen, and the cracked gas comprising hydrogen, nitrogen, and carbon dioxide, and optionally undissociated ammonia, can be collected as it exits the catalyst filled tubes.

In an embodiment, the ammonia cracker unit can be characterized by a cracking temperature of from about 450° C. to about 550° C., alternatively from about 460° C. to about 530° C., or alternatively from about 475° C. to about 525° C. In an embodiment, the ammonia cracker unit can be characterized by a cracking pressure of from about 300 psig to about 600 psig, alternatively from about 350 psig to about 550 psig, or alternatively from about 400 psig to about 500 psig.

In an embodiment, the cracked gas can have a temperature of from about 450° C. to about 550° C., alternatively from about 460° C. to about 530° C., or alternatively from about 475° C. to about 525° C. In an embodiment, the cracked gas can exchange heat with the compressing unit (e.g., with the ammonia rich gas being compressed in the compressing unit) to produce a cooled cracked gas, thereby increasing the temperature of the ammonia rich gas being compressed in the compressing unit. In an embodiment, the cooled cracked gas can have a temperature of from about 150° C. to about 200° C., alternatively from about 160° C. to about 190° C., or alternatively from about 170° C. to about 180° C.

In an embodiment, the cooled cracked gas can be further cooled, if necessary to achieve a temperature suitable for introducing to the PSA unit, in a heat exchanger, such as for example in an air or liquid (e.g., water) cooled heat exchanger.

In an embodiment, a method for producing hydrogen ($H_2$) can comprise introducing at least a portion of the cracked gas (e.g., cooled cracked gas) to a PSA unit to produce hydrogen and a PSA tail gas, wherein the PSA tail gas comprises nitrogen and carbon dioxide, and optionally residual hydrogen. In an embodiment, the PSA unit comprises an adsorbent material. PSA is generally based on physical binding of gas molecules (e.g., hydrogen, nitrogen, carbon dioxide, etc.) to an adsorbent material. Binding strength between the gas molecules and the adsorbent material depends on the gas components, type of adsorbent material, partial pressures of the gas components and operating temperature. Purifying a gas by PSA separation is based on differences in binding strength of the gas components to the adsorbent material. Highly volatile components with low polarity, such as hydrogen, are practically non-adsorbable, as opposed to molecules like nitrogen and carbon dioxide. PSA generally has an adsorption step, and a desorption step. During the adsorption step, high purity hydrogen can be recovered from a PSA unit, as hydrogen will not be adsorbed. Nitrogen and carbon dioxide will be adsorbed by the adsorbent material, and can be recovered during the desorption step. As will be appreciated by one of skill in the art, and with the help of this disclosure, nitrogen is strongly adsorbed on zeolites (due to a quadrupole moment), but not on carbon-based adsorbent materials.

PSA works at basically constant temperature and uses the effect of alternating pressure and partial pressure to perform the adsorption step and the desorption step. Since heating or cooling is not required, short cycles within the range of minutes can be achieved. A cycle can be defined as the time between the start of two consecutive adsorption steps. The adsorption is carried out at high pressure, until an equilibrium loading is reached, wherein no further adsorption capacity is available and the adsorbent material must be regenerated. The regeneration step can be done by lowering the pressure to slightly above atmospheric pressure resulting in a respective decrease in equilibrium loading. As a result, the gases (e.g., nitrogen, carbon dioxide) that were adsorbed by the adsorbent material are desorbed and the adsorbent material is regenerated. Once the regeneration step is completed, the pressure is increased back to adsorption pressure level and another adsorption step begins. Generally, PSA also involves a purge step between the desorption step and the adsorption step, to ensure that the adsorber material is ready to undergo the next adsorption step.

Non-limiting examples of adsorbent materials suitable for use in the present disclosure include molecular sieves, zeolites, such as 5A zeolite and 13X zeolite, and the like, or combinations thereof.

In an embodiment, the cracked gas (e.g., cooled cracked gas) can be introduced to the PSA unit at the bottom, and can travel upwards through the adsorbent material, wherein hydrogen can be recovered at a top of the PSA unit during the adsorption step. In such embodiment, the PSA tail gas comprising nitrogen and carbon dioxide can be recovered at the bottom of the PSA unit during the desorption step.

In an embodiment, the PSA unit comprises from about 2 to about 10 PSA units, alternatively from about 3 to about 8 PSA units, alternatively from about 3 to about 6 PSA units operating in parallel, to provide a continuous supply of hydrogen, and to provide for a continuous uptake of cracked gas (e.g., cooled cracked gas). Once an adsorption step is completed in a PSA unit, and such unit starts a desorption step, another PSA unit can take over the adsorption step to ensure a continuous process. As will be appreciated by one of skill in the art, and with the help of this disclosure, more than one PSA unit can undergo the adsorption step at the same time, and similarly, more than one PSA unit can undergo the desorption step at the same time. As long as there is always a PSA unit undergoing an adsorption step and/or ready to undergo an adsorption step, hydrogen production can be continuous.

In an embodiment, the hydrogen can be characterized by a purity of equal to or greater than about 99%, alternatively equal to or greater than about 99.9%, or alternatively equal to or greater than about 99.99%.

In an embodiment, the adsorption step can be carried out at a pressure of from about 375 psig to about 575 psig, alternatively from about 400 psig to about 550 psig, or alternatively from about 450 psig to about 500 psig.

In an embodiment, the hydrogen can be characterized by a pressure of from about 375 psig to about 575 psig, alternatively from about 400 psig to about 550 psig, or alternatively from about 450 psig to about 500 psig. As will be appreciated by one of skill in the art, and with the help of this disclosure, the hydrogen can have about the same pressure as the pressure used for the adsorption step.

In an embodiment, the desorption step can be carried out at a pressure of from about 5 psig to about 50 psig, alternatively from about 10 psig to about 45 psig, alternatively from about 20 psig to about 40 psig, alternatively from about 25 psig to about 35 psig, or alternatively from about 25 psig to about 30 psig.

In an embodiment, the PSA tail gas can be characterized by a pressure of from about 5 psig to about 50 psig, alternatively from about 10 psig to about 45 psig, alternatively from about 20 psig to about 40 psig, alternatively from about 25 psig to about 35 psig, or alternatively from about 25 psig to about 30 psig. As will be appreciated by one of skill in the art, and with the help of this disclosure, the PSA tail gas can have about the same pressure as the pressure used for the desorption step.

In an embodiment, the PSA tail gas can comprise nitrogen in an amount of from about 10 mol % to about 25 mol %, alternatively from about 12.5 mol % to about 22.5 mol %, or alternatively from about 15 mol % to about 20 mol %.

In an embodiment, the PSA tail gas can further comprise hydrogen (e.g., residual hydrogen). Residual hydrogen in the PSA tail gas can usually come from hydrogen that remains in the PSA unit once the adsorption step is finished, and such residual hydrogen is recovered in the PSA tail gas during the desorption step.

In an embodiment, at least a portion of the PSA tail gas can be combined with the fuel used for heating the ammonia cracker unit. The flue gas can comprise the carbon dioxide and the nitrogen of the PSA tail gas. The residual hydrogen from the PSA tail gas can combust in the ammonia cracker unit to provide for heating the ammonia cracker unit, and the flue gas can comprise water vapor from such combustion.

In an embodiment, a method for producing hydrogen can comprise (a) receiving a sour water from a shift unit, wherein the sour water comprises water, carbon dioxide, hydrogen sulfide, and ammonia; (b) introducing at least a portion of the sour water to a sour water stripper to produce a sour gas, wherein the sour gas comprises carbon dioxide, hydrogen sulfide, and ammonia, and wherein a molar ratio of ammonia to hydrogen sulfide in the sour gas can be equal to or greater than about 1:1; (c) introducing at least a portion of the sour gas to an absorption unit comprising DGA to produce an ammonia rich gas and a sulfide rich DGA, wherein the sulfide rich DGA comprises at least a portion of the hydrogen sulfide of the sour gas and equal to or greater than about 30% of the carbon dioxide of the sour gas, wherein the ammonia rich gas comprises at least a portion of the ammonia of the sour gas and less than about 30% of the carbon dioxide of the sour gas, and wherein the ammonia rich gas comprises sulfur in an amount of less than about 30 ppmv; (d) introducing at least a portion of the sulfide rich DGA to a DGA regeneration unit to produce a sulfide rich gas, and DGA; (e) introducing at least a portion of the sulfide rich gas to a sulfur recovery unit to produce elemental sulfur, (f) recycling at least a portion of the DGA produced in the DGA regeneration unit to the absorption unit; (g) compressing at least a portion of the ammonia rich gas in a compressing unit to a pressure of from about 475 psig to about 525 psig to produce a compressed ammonia rich gas; (h) introducing at least a portion of the compressed ammonia rich gas to an ammonia cracker unit to produce a cracked gas, wherein the ammonia cracker unit comprises a nickel-based catalyst, wherein the ammonia cracker unit can be characterized by a cracking temperature of from about 475° C. to about 525° C., and wherein the cracked gas comprises hydrogen, nitrogen, and carbon dioxide; and (i) introducing at least a portion of the cracked gas to a PSA unit to produce hydrogen and a PSA tail gas, wherein the PSA tail gas comprises nitrogen, and carbon dioxide, and wherein the hydrogen is characterized by a purity of equal to or greater than about 99.9%.

Referring to the embodiment of FIG. 1, a hydrogen production system 1000 is disclosed. The hydrogen production system 1000 generally comprises a sour water stripper 100; a DGA absorber (e.g., absorption unit) 200; a DGA stripper (e.g., solvent regeneration unit, DGA regeneration unit) 250; a sulfur removal unit 300; a compressing unit 400; an ammonia cracker unit 500; and a PSA unit 600. As will be appreciated by one of skill in the art, and with the help of this disclosure, components of the hydrogen production system can be in fluid communication with each other through any suitable conduits (e.g., pipes, streams, etc.).

In an embodiment, a method for producing hydrogen can comprise (a) introducing a sour water stream 10 to the sour water stripper 100 to produce a sour gas stream 15, wherein the sour gas comprises carbon dioxide, hydrogen sulfide, and ammonia, wherein a molar ratio of ammonia to hydrogen sulfide in the sour gas can be equal to or greater than about 1:1, and wherein the sour gas can be characterized by a pressure of about 30 psig; (h) introducing at least a portion of the sour gas stream 15 to the DGA absorber 200 (e.g., an absorption unit comprising DGA) to produce an ammonia rich gas stream 21 and a sulfide rich DGA solvent stream 22 (e.g., rich solvent), wherein the sulfide rich DGA solvent comprises at least a portion of the hydrogen sulfide of the sour gas and equal to or greater than about 30% of the carbon dioxide of the sour gas, wherein the ammonia rich gas comprises at least a portion of the ammonia of the sour gas and less than about 30% of the carbon dioxide of the sour gas, and wherein the ammonia rich gas comprises sulfur in an amount of less than about 30 ppmv; (c) introducing at least a portion of the sulfide rich DGA solvent stream 22 to the DGA stripper 250 to produce a sulfide rich gas stream 25, and a DGA solvent stream 23, wherein the DGA stripper 250 comprises a reboiler, and wherein the sulfide rich gas can have an ammonia content of from about 0.1 mol % to about 10 mol %; (d) communicating at least portion of the DGA solvent from the DGA stripper 250 to the reboiler to produce DGA solvent vapors, wherein at least a portion of the DGA solvent vapors can be recycled to the DGA stripper 250, wherein the reboiler can be heated by using a low pressure (LP) steam stream 26, wherein the LP steam stream 26 can condense and can be recovered from the reboiler as LP condensate stream 27 (e.g., aqueous condensate), and wherein at least a portion of the of the condensate can be used for producing the LP steam; (e) introducing at least a portion of the sulfide rich gas stream 25 to a sulfur recovery unit in a Claus plant (e.g., sulfur plant) to produce elemental sulfur; (f) recycling at least a portion of the DGA solvent stream 23 (e.g., lean solvent) to the DGA absorber 200; (g) optionally introducing at least a portion of the ammonia rich gas stream 21 to the sulfur removal unit 300 to produce a purified ammonia rich gas stream 31, wherein the sulfur removal unit 300 comprises a fixed catalyst bed comprising mixed metal oxides (e.g., PURASPEC fixed bed); (h) introducing at least a portion of the purified ammonia rich gas stream 31 to the compressing unit 400 to produce a compressed ammonia rich gas stream 41, wherein the compressed ammonia rich gas has a pressure of about 500 psig, and wherein the compressed ammonia rich gas can be preheated to a temperature of from about 250° C. to about 500° C. by exchanging heat with a cracked gas stream 51 (e.g., hot gas); (i) introducing at least a portion of the compressed ammonia rich gas stream 41 to the ammonia cracker unit 500 to produce the cracked gas stream 51, wherein the ammonia cracker unit 500 comprises a nickel-based catalyst, wherein the ammonia cracker unit 500 can be characterized by a cracking temperature of from about 475° C. to about 525° C., wherein the cracked gas comprises hydrogen, nitrogen, and carbon dioxide, wherein at least a portion of the cracked gas stream 51 can exchange heat in the compressing unit 400 to produce a cooled cracked gas stream 52, wherein the cracked gas stream 51 can have a temperature of from about 475° C. to about 525° C., and wherein the cooled cracked gas stream 52 can have a temperature of from about 150° C. to about 200° C.; (j) introducing at least a portion of cooled cracked gas stream 52 to the PSA unit 600 to produce a hydrogen stream 61 and a PSA tail gas stream 62, wherein the PSA tail gas comprises nitrogen, carbon dioxide, and residual hydrogen, wherein the hydrogen stream 61 can be characterized by a pressure of about 475 psig, and wherein the hydrogen stream 61 can be characterized by a purity of equal to or greater than about 99.99%; and (k) contacting at least a portion of the PSA tail gas stream 62 with a fuel stream 53, wherein the fuel stream 53 can be used for heating the ammonia cracker unit 500, and wherein fuel burning products can be emitted from the ammonia cracker unit 500 via a flue gas stream 54, In an embodiment, a method for producing hydrogen as disclosed herein can advantageously display improvements in one or more method characteristics when compared to conventional methods of producing hydrogen. The method for producing hydrogen as disclosed herein can advantageously use a waste stream (e.g., sour water, sour gas) for producing hydrogen, thereby eliminating the need to treat and/or dispose of the waste stream. Further, the method for producing hydrogen as disclosed herein can advantageously produce a sulfide rich gas stream that is suitable for use in a Claus plant, due to a low ammonia content of the sulfide rich gas. Additional advantages of the methods for the production of hydrogen as disclosed herein can be apparent to one of skill in the art viewing this disclosure.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

Additional Disclosure

A first embodiment, which is a method of producing hydrogen comprising (a) receiving a sour gas from a sour water stripper, wherein the sour gas comprises carbon dioxide, hydrogen sulfide, and ammonia; (b) introducing the sour gas to an absorption system to produce an ammonia rich gas and a sulfide rich gas, wherein the sour gas comprises carbon dioxide, hydrogen sulfide, and ammonia, wherein the ammonia rich gas comprises ammonia and carbon dioxide, and wherein the sulfide rich gas comprises hydrogen sulfide and carbon dioxide; (c) compressing at least a portion of the ammonia rich gas in a compressing unit to a pressure of from about 400 psig to about 600 psig to produce a compressed ammonia rich gas; (d) introducing at least a portion of the compressed ammonia rich gas to an ammonia cracker unit to produce a cracked gas, wherein the ammonia cracker unit comprises a catalyst, wherein the ammonia cracker unit is characterized by a cracking temperature of from about 450° C. to about 550° C., and wherein the cracked gas comprises hydrogen, nitrogen, and carbon dioxide; and (e) introducing at least a portion of the cracked gas to a pressure swing adsorption (PSA) unit to produce hydrogen and a PSA tail gas, wherein the PSA tail gas comprises nitrogen and carbon dioxide.

A second embodiment, which is the method of the first embodiment, wherein the sour gas is characterized by a pressure of from about 5 psig to about 50 psig.

A third embodiment, which is the method of any one of the first and the second embodiments, wherein the sour gas is generated by a sour gas source, wherein the sour gas source comprises a sour water stripper, an acid gas removal unit, a low-temperature gasification unit, a hydroprocessing unit that is configured to receive a feedstock containing equal to or greater than about 2,000 ppm nitrogen, or combinations thereof.

A fourth embodiment, which is the method of any one of the first through the third embodiments, wherein the sour gas comprises ammonia in an amount of equal to or greater than about 10 mol %.

A fifth embodiment, which is the method of any one of the first through the fourth embodiments, wherein the ammonia rich gas comprises sulfur in an amount of less than about 50 ppmv.

A sixth embodiment, which is the method of any one of the first through the fifth embodiments, wherein the absorption system comprises an absorption unit and a solvent regeneration unit, wherein the absorption unit comprises an absorber solvent, wherein the sour gas is introduced to the absorption unit to produce the ammonia rich gas and a sulfide rich solvent, wherein the sulfide rich solvent comprises at least a portion of the hydrogen sulfide of the sour gas and a portion of the carbon dioxide of the sour gas, and wherein the ammonia rich gas comprises at least a portion of the ammonia of the sour gas and a portion of the carbon dioxide of the sour gas.

A seventh embodiment, which is the method of the sixth embodiment, wherein the absorber solvent comprises diglycolamine; a strongly basic amine, methylethylamine, piperazine, 2-methylpiperazine; blends of methyl diethanolamine with a strongly basic amine; or combinations thereof.

An eighth embodiment, which is the method of any one of the first through the seventh embodiments, wherein at least a portion of the sulfide rich solvent is introduced to the solvent regeneration unit to produce the sulfide rich gas and the absorber solvent.

A ninth embodiment, which is the method of the eighth embodiment, wherein a portion of the absorber solvent produced in the solvent regeneration unit is recycled to the absorption unit.

A tenth embodiment, which is the method of any one of the first through the ninth embodiments, wherein a portion of the absorber solvent produced in the solvent regeneration unit is sent to a reboiler to produce absorber solvent vapors, and wherein at least a portion of the absorber solvent vapors is recycled to the solvent regeneration unit.

An eleventh embodiment, which is the method of any one of the first through the tenth embodiments, wherein the ammonia rich gas contains equal to or greater than about 50% of the ammonia of the sour gas, and wherein the sulfide rich gas contains less than about 50% of the ammonia of the sour gas.

A twelfth embodiment, which is the method of any one of the first through the eleventh embodiments, wherein at least a portion of the sulfide rich gas is introduced to a sulfur recovery unit to produce sulfur.

A thirteenth embodiment, which is the method of any one of the first through the twelfth embodiments, wherein at least a portion of the ammonia rich gas is further introduced to a sulfur removal unit to produce a purified ammonia rich gas, wherein the purified ammonia rich gas comprises sulfur in an amount of less from about 10 ppmv to about 50 ppmv.

A fourteenth embodiment, which is the method of the thirteenth embodiment, wherein at least a portion of the purified ammonia rich gas is compressed to a pressure of from about 400 psig to about 600 psig to produce the compressed ammonia rich gas.

A fifteenth embodiment, which is the method of any one of the first through the fourteenth embodiments, wherein the cracked gas exchanges heat with the compressing unit to produce a cooled cracked gas, wherein the cracked gas has a temperature of from about 450° C. to about 550° C., and wherein the cooled cracked gas has a temperature of from about 150° C. to about 200° C.

A sixteenth embodiment, which is the method of the fifteenth embodiment, wherein at least a portion of the cooled cracked gas is introduced to the PSA unit to produce the hydrogen and the PSA tail gas.

A seventeenth embodiment, which is the method of any one of the first through the sixteenth embodiments, wherein the ammonia rich gas is heated in the compressing unit, wherein the compressed ammonia rich gas has a temperature of from about 250° C. to about 500° C.

An eighteenth embodiment, which is the method of any one of the first through the seventeenth embodiments, wherein at least a portion of the PSA tail gas is contacted with a fuel used for heating the ammonia cracker unit.

A nineteenth embodiment, which is the method of any one of the first through the eighteenth embodiments, wherein the PSA tail gas is characterized by a pressure of from about 5 psig to about 50 psig.

A twentieth embodiment, which is the method of any one of the first through the nineteenth embodiments, wherein the hydrogen is characterized by a pressure of from about 375 psig to about 575 psig.

A twenty-first embodiment, which is the method of any one of the first through the twentieth embodiments, wherein the hydrogen is characterized by a purity of equal to or greater than about 99%.

A twenty-second embodiment, which is the method any one of the first through the twenty-first embodiments, wherein a molar ratio of ammonia to hydrogen sulfide in the sour gas is equal to or greater than about 1:1.

A twenty-third embodiment, which is the method of any one of the first through the twenty-second embodiments, wherein the sour gas is produced from the sour water stripper.

A twenty-fourth embodiment, which is the method of any one of the first through the twenty-third embodiments, wherein the catalyst is a nickel-based catalyst.

A twenty-fifth embodiment, which is a method of producing hydrogen comprising (a) receiving sour water from a shift unit, wherein the sour water comprises water, carbon dioxide, hydrogen sulfide, and ammonia; (b) introducing at least a portion of the sour water to a sour water stripper to produce a sour gas, wherein the sour gas comprises carbon dioxide, hydrogen sulfide, and ammonia; (c) introducing at least a portion of the sour gas to an absorption unit comprising an absorber solvent to produce an ammonia rich gas and a sulfide rich solvent, wherein the sulfide rich solvent comprises at least a portion of the hydrogen sulfide of the sour gas and a portion of the carbon dioxide of the sour gas, wherein the ammonia rich gas comprises at least a portion of the ammonia of the sour gas and a portion of the carbon dioxide of the sour gas, and wherein the ammonia rich gas comprises sulfur in an amount of less than about 30 ppmv; (d) introducing at least a portion of the sulfide rich solvent to a solvent regeneration unit to produce a sulfide rich gas, and the absorber solvent; (e) introducing at least a portion of the sulfide rich gas to a sulfur recovery unit to produce sulfur; (f) recycling at least a portion of the absorber solvent produced in the solvent regeneration unit to the absorption unit; (g) compressing at least a portion of the ammonia rich gas in a compressing unit to a pressure of from about 475 psig to about 525 psig to produce a compressed ammonia rich gas; (h) introducing at least a portion of the compressed ammonia rich gas to an ammonia cracker unit to produce a cracked gas, wherein the ammonia cracker unit comprises a nickel-based catalyst, wherein the ammonia cracker unit is characterized by a cracking temperature of from about 475° C. to about 525° C., and wherein the cracked gas comprises hydrogen, nitrogen, and carbon dioxide; and (i) introducing at least a portion of the cracked gas to a pressure swing adsorption (PSA) unit to produce hydrogen and a PSA tail gas, wherein the PSA tail gas comprises nitrogen and carbon dioxide, and wherein the hydrogen is characterized by a purity of equal to or greater than about 99%.

A twenty-sixth embodiment, which is the method of the twenty-fifth embodiment, wherein the absorber solvent comprises diglycolamine.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of producing hydrogen comprising:
   (a) receiving a sour gas from a sour water stripper, wherein the sour gas comprises carbon dioxide, hydrogen sulfide, and ammonia;
   (b) introducing the sour gas to a solvent based, absorption system to produce an ammonia rich gas and a sulfide rich gas, wherein the ammonia rich gas comprises ammonia and carbon dioxide, and wherein the sulfide rich gas comprises hydrogen sulfide and carbon dioxide;
   (c) compressing at least a portion of the ammonia rich gas in a compressing unit to a pressure of from about 400 psig to about 600 psig to produce a compressed ammonia rich gas;
   (d) introducing at least a portion of the compressed ammonia rich gas to an ammonia cracker unit to produce a cracked gas, wherein the ammonia cracker unit comprises a catalyst, wherein the ammonia cracker unit is characterized by a cracking temperature of from about 450° C. to about 550° C., wherein the cracked gas comprises hydrogen, nitrogen, and carbon dioxide, wherein the ammonia rich gas is heated in the compressing unit, and wherein the cracked gas exchanges heat with the compressing unit to produce a cooled cracked gas; and
   (e) introducing a gas stream consisting of the cooled cracked gas to a pressure swing adsorption (PSA) unit to produce hydrogen and a PSA tail gas, wherein the PSA tail gas comprises nitrogen and carbon dioxide.

2. The method of claim 1, wherein the sour gas is characterized by a pressure of from about 5 psig to about 50 psig.

3. The method of claim 1, wherein the sour gas is generated by a sour gas source, wherein the sour gas source comprises a sour water stripper, an acid gas removal unit, a low-temperature gasification unit, a hydroprocessing unit that is configured to receive a feedstock containing equal to or greater than about 2,000 ppm nitrogen, or combinations thereof.

4. The method of claim 1, wherein the sour gas comprises ammonia in an amount of equal to or greater than about 10 mol %.

5. The method of claim 1, wherein the ammonia rich gas comprises sulfur in an amount of less than about 50 ppmv.

6. The method of claim 1, wherein the absorption system comprises an absorption unit and a solvent regeneration unit, wherein the absorption unit comprises an absorber solvent, wherein the sour gas is introduced to the absorption unit to produce the ammonia rich gas and a sulfide rich solvent, wherein the sulfide rich solvent comprises at least a portion of the hydrogen sulfide of the sour gas and a portion of the carbon dioxide of the sour gas, and wherein the ammonia rich gas comprises at least a portion of the ammonia of the sour gas and another portion of the carbon dioxide of the sour gas.

7. The method of claim 6, wherein the absorber solvent comprises diglycolamine; a basic amine, methylethylamine, piperazine, 2-methylpiperazine; blends of methyl diethanolamine with a basic amine; or combinations thereof.

8. The method of claim 6, wherein at least a portion of the sulfide rich solvent is introduced to the solvent regeneration unit to produce the sulfide rich gas and the absorber solvent.

9. The method of claim 8, wherein a portion of the absorber solvent produced in the solvent regeneration unit is recycled to the absorption unit.

10. The method of claim 8, wherein a portion of the absorber solvent produced in the solvent regeneration unit is sent to a reboiler to produce absorber solvent vapors, and wherein at least a portion of the absorber solvent vapors is recycled to the solvent regeneration unit.

11. The method of claim 1, wherein the ammonia rich gas contains equal to or greater than about 50 mol % of the ammonia of the sour gas, and wherein the sulfide rich gas contains less than about 50 mol % of the ammonia of the sour gas.

12. The method of claim 1, wherein at least a portion of the sulfide rich gas is introduced to a sulfur recovery unit to produce sulfur.

13. The method of claim 1, wherein at least a portion of the ammonia rich gas is further introduced to a sulfur removal unit to produce a purified ammonia rich gas, wherein the purified ammonia rich gas comprises sulfur in an amount of less from about 10 ppmv to about 50 ppmv.

14. The method of claim 13, wherein at least a portion of the purified ammonia rich gas is compressed to a pressure of from about 400 psig to about 600 psig to produce the compressed ammonia rich gas.

15. The method of claim 1, wherein the cracked gas has a temperature of from about 450° C. to about 550° C., and wherein the cooled cracked gas has a temperature of from about 150° C. to about 200° C.

16. The method of claim 1, wherein at least a portion of the cooled cracked gas is introduced to the PSA unit to produce the hydrogen and the PSA tail gas.

17. The method of claim 1, wherein the compressed ammonia rich gas has a temperature of from about 250° C. to about 500° C.

18. The method of claim 1, wherein at least a portion of the PSA tail gas is contacted with a fuel used for heating the ammonia cracker unit.

19. The method of claim 1, wherein the PSA tail gas is characterized by a pressure of from about 5 psig to about 50 psig.

20. The method of claim 1, wherein the hydrogen is characterized by a pressure of from about 375 psig to about 575 psig.

21. The method of claim 1, wherein the hydrogen is characterized by a purity of equal to or greater than about 99%.

22. The method of claim 1, wherein a molar ratio of ammonia to hydrogen sulfide in the sour gas is equal to or greater than about 1:1.

23. The method of claim 1, wherein the sour gas is produced in the sour water stripper.

24. The method of claim 1, wherein the catalyst is a nickel-based catalyst.

* * * * *